United States Patent
Thornton et al.

(10) Patent No.: US 9,989,266 B2
(45) Date of Patent: Jun. 5, 2018

(54) AUTOMATIC SET POINT DETECTION FOR WATER HEATERS OPERATING IN A DEMAND RESPONSE

(71) Applicant: Battelle Memorial Institute, Columbus, OH (US)

(72) Inventors: Douglas Thornton, Upper Arlington, OH (US); Jason W. Black, Dublin, OH (US); Lauren Adams, Hilliard, OH (US)

(73) Assignee: Battelle Memorial Institute, Columbus, OH (US)

( * ) Notice: Subject to any disclaimer, the term of this patent is extended or adjusted under 35 U.S.C. 154(b) by 224 days.

(21) Appl. No.: 14/976,878

(22) Filed: Dec. 21, 2015

(65) Prior Publication Data

US 2016/0178239 A1 Jun. 23, 2016

Related U.S. Application Data

(60) Provisional application No. 62/095,616, filed on Dec. 22, 2014.

(51) Int. Cl.
*F24D 19/10* (2006.01)
*F24H 9/20* (2006.01)
(Continued)

(52) U.S. Cl.
CPC ..... *F24D 19/1063* (2013.01); *F24D 19/1051* (2013.01); *F24H 1/185* (2013.01);
(Continued)

(58) Field of Classification Search
CPC .... F24H 1/0018; F24H 9/1818; F24H 9/2014; F24H 9/2021; F24H 9/2071;
(Continued)

(56) References Cited

U.S. PATENT DOCUMENTS

| | | | |
|---|---|---|---|
| 4,333,002 A * | 6/1982 | Kozak | G05D 23/1917 219/483 |
| 4,511,790 A * | 4/1985 | Kozak | F24H 9/2014 219/483 |

(Continued)

OTHER PUBLICATIONS

Fanney et al.; The Thermal Performance of Residential Electric Water Heaters Subjected to Various Off-Peak Schedules; Journal of Solar Energy Engineering; vol. 118; pp. 73-80; 1996.

(Continued)

*Primary Examiner* — Crystal J Barnes-Bullock
(74) *Attorney, Agent, or Firm* — Richard M. Klein; Fay Sharpe LLP

(57) ABSTRACT

An electric water heater that includes a thermostat is retrofitted for remote control as follows. A relay is installed on an electrical feed to the electric water heater. Water temperature and electric current or power through the electrical feed are measured over time with the relay closed, and the thermostat deadband maximum and minimum are detected as the water temperature at which the thermostat turns the heating element off, and the water temperature at which the thermostat turns the heating element on, respectively. The detected thermostat deadband maximum and minimum are stored as load controller deadband maximum and minimum, respectively. The thermostat set point is raised, and the electric water heater is thereafter controlled using the load controller by operations including closing the relay when the water temperature falls below the load controller deadband minimum and opening the relay when the water temperature rises above the load controller deadband maximum.

16 Claims, 5 Drawing Sheets

(51) Int. Cl.

| | | |
|---|---|---|
| *F24H 1/18* | (2006.01) | |
| *G05B 15/02* | (2006.01) | |
| *G05F 1/66* | (2006.01) | |
| *G05B 13/02* | (2006.01) | |
| *G05D 23/20* | (2006.01) | |
| *G06N 3/12* | (2006.01) | |
| *G05D 23/19* | (2006.01) | |
| *H05B 1/02* | (2006.01) | |

(52) U.S. Cl.
CPC ......... *F24H 9/2014* (2013.01); *F24H 9/2021* (2013.01); *G05B 13/024* (2013.01); *G05B 13/0265* (2013.01); *G05B 15/02* (2013.01); *G05D 23/1919* (2013.01); *G05D 23/20* (2013.01); *G05F 1/66* (2013.01); *G06N 3/126* (2013.01); *H05B 1/0283* (2013.01)

(58) Field of Classification Search
CPC ............. F24D 19/1051; F24D 19/1063; F24D 19/1069; F24D 19/1081; F24D 2200/04; F24D 2200/08; G05B 13/024; G05B 13/0265; G05B 15/02; G05B 17/02; G06N 3/126; G05D 23/1919; G05D 23/1923; G05D 23/20; G05D 23/24; G05F 1/66; H05B 1/02; H05B 1/0283; H05B 3/82; H02J 3/14; H02J 3/28; H02J 2003/146; Y04S 10/30; Y04S 20/222; Y04S 20/244; Y02B 30/762; Y02B 70/3225; Y02B 70/3275; Y02B 90/2653
See application file for complete search history.

(56) References Cited

U.S. PATENT DOCUMENTS

| | | | | |
|---|---|---|---|---|
| 5,924,486 A * | 7/1999 | Ehlers | ............... | F24F 11/006 165/238 |
| 6,097,904 A * | 8/2000 | Tsuruno | ............ | G03G 15/2003 219/494 |
| 6,363,216 B1 * | 3/2002 | Bradenbaugh | .......... | F24H 1/202 219/441 |
| 8,204,633 B2 * | 6/2012 | Harbin, III | .......... | F24D 19/1051 219/483 |
| 8,426,777 B2 * | 4/2013 | Elston, III | ............. | F24C 7/087 219/391 |
| 8,494,990 B1 * | 7/2013 | Engler | ................... | G06N 3/126 706/13 |
| 8,583,572 B1 * | 11/2013 | Engler | ................... | G06N 3/126 706/13 |
| 8,768,526 B2 * | 7/2014 | Harbin, III | .......... | F24D 19/1051 219/483 |
| 9,002,483 B1 * | 4/2015 | Engler | ................ | G05B 13/024 122/14.1 |
| 2007/0108187 A1 * | 5/2007 | Ding | .................... | F24H 9/2021 219/492 |
| 2011/0166712 A1 * | 7/2011 | Kramer | .............. | G05D 23/1919 700/278 |
| 2014/0321839 A1 * | 10/2014 | Armstrong | ............ | F24H 9/2021 392/463 |
| 2016/0178221 A1 * | 6/2016 | Thornton | ............ | F24D 19/1069 700/295 |
| 2016/0233677 A1 * | 8/2016 | Douglass | .................. | H02J 3/14 |
| 2016/0315472 A1 * | 10/2016 | McCullough | ............. | H02J 3/00 |
| 2017/0126007 A1 * | 5/2017 | Trudel | ...................... | H02J 3/14 |
| 2017/0268797 A1 * | 9/2017 | Mowris | ................. | F24H 9/2071 |

OTHER PUBLICATIONS

Vrettos et al.; Load Frequency Control by Aggregations of Thermally Stratified Electric Water Heaters; Innovative Smart Grid Technologies (ISGT Europe); 2012.

Koch, S.; Demand Response Methods for Ancillary Services and Renewable Energy Integration in Electric Power Systems; Dipl.-Ing., University of Stuttgart; Diss. No. 20470; 2012.

* cited by examiner

AUTOMATIC SET POINT DETECTION FOR WATER HEATERS OPERATING IN A DEMAND RESPONSE

This application claims the benefit of U.S. Provisional Application No. 62/095,616 filed Dec. 22, 2014 and titled "AUTOMATIC SET POINT DETECTION FOR WATER HEATERS OPERATING IN A DEMAND RESPONSE". U.S. Provisional Application No. 62/095,616 filed Dec. 22, 2014 is incorporated herein by reference in its entirety.

BACKGROUND

The following relates to the water heater arts, water heater control arts, and related arts.

In electrical power systems, the power generation should match the power draw in order to maintain desired grid operating characteristics such as voltage, frequency, and so forth. Conventionally, this is achieved by adjusting the power generation to meet the demand, for example by bringing ancillary diesel power generators online or offline. Energy can also be stored in batteries, flywheels or the like, but this adds infrastructure expense and power losses.

Another approach for balancing generation and load is demand response, in which the load draw is increased or decreased to improve match with power generation. Various demand response techniques exist, such as peak shaving or load shifting, which operate on relatively long time scales typically on the order of tens of minutes to hours. Another demand response technique, called frequency regulation, increases or decreases load draw rapidly in response to an automatic generation control (AGC) signal associated with the electrical power grid and updated, for example, every four seconds. Frequency regulation operates at shorter time scales on the order of seconds to tens of seconds.

Water heaters are an attractive type of load for use in demand response systems, because a water heater stores thermal energy as hot water. A demand response system can remotely control the water heater in order to store or extract energy on demand, and relatively quickly. In executing remote control of the water heater, the demand response system should operate in a manner that ensures the water temperature is maintained within a temperature range that is acceptable to the end user. Additionally, the remote control should have safeguards to ensure that a failure of the remote control cannot cause the water to overheat to a dangerously high temperature capable of harming a person using the hot water output.

In one conventional approach, the remote control is implemented as a retrofitted power relay capable of opening to switch off electrical power to the water heater. When the relay is closed, electrical power is delivered, and the water heater is controlled in the usual way by its thermostat(s) in accord with the temperature set point adjusted by the end-user. This approach is suitable for demand response functions such as peak shaving, as it can operate to prevent the water heater from drawing power during power curtailment time intervals. It has numerous advantages: the remote control cannot cause unsafe water overheating, installation is simple, and the existing thermostat settings and control remain in effect so that the remote control is transparent to the end user (except possibly during curtailment intervals). However, this approach cannot be used for demand response modes that require actively energizing the heating elements, such as load shifting or frequency regulation.

In order to retrofit a water heater to enable remotely turning the heating element(s) both on and off, the existing thermostat may be replaced. However, this complicates the retrofit process and adds cost. Additionally, the remotely controllable replacement thermostat must be robust against failure so that the remote control cannot inadvertently raise the water to an unsafe temperature.

In a variant approach, the existing thermostat is not removed or deactivated, but rather its set point is raised to a high temperature so that it is always keeping the heating elements on. The added remotely controllable thermostat then performs the actual control. Since the original thermostat set point is raised to a high value, the replacement thermostat still must be robust against failure so that the remote control cannot inadvertently raise the water to an unsafe temperature. One way to do this is to add a mechanical mixing valve to add cold water at the hot water outlet to limit the maximum outlet temperature. This again increases retrofit complexity and cost.

In either of these approaches, the original temperature settings of the existing water heater are lost, causing a change in the delivery temperature of hot water. Additionally, the end-user must perform any temperature set point adjustments using the replacement temperature control system, rather than by using the familiar existing temperature set point adjustment of the water heater.

BRIEF SUMMARY

In some illustrative embodiments disclosed as illustrative examples herein, an electric water heater control system is disclosed for controlling a water heater having a heating element and a thermostat. The electric water heater control system comprises: a power regulation device (for example, a relay) configured to regulate electrical power to the heating element of the water heater; and a load controller operatively coupled to operate the power regulation device, the load controller comprising an electronic data processing device, non-transitory storage storing at least load controller deadband limits, and a communication link. The load controller is programmed to perform a thermostat algorithm to operate the power regulation device to regulate water temperature in the electric water heater respective to the stored load controller deadband limits In some illustrative embodiments disclosed as illustrative examples herein, an electric water heater includes a heating element and a thermostat having a raised thermostat deadband maximum. A power regulation device, for example a relay, is configured to regulate power to the heating element of the electric water heater. A load controller is operatively coupled to operate the power regulation device. The load controller comprises an electronic data processing device and non-transitory storage storing at least load controller deadband limits and the raised thermostat deadband maximum which is raised as compared with the load controller deadband maximum. The load controller is configured to perform a thermostat algorithm to operate the power regulation device to regulate water temperature in the electric water heater respective to the load controller deadband limits without the regulated water temperature reaching the raised thermostat deadband maximum.

In some illustrative embodiments disclosed as illustrative examples herein, a method is disclosed of retrofitting an electric water heater that includes a thermostat for remote control of the electric water heater. The method comprises: installing a relay on an electrical feed to the electric water heater; measuring water temperature in the electric water heater and electric current or power through the electrical feed to the electrical water heater over time with the relay closed; during the measuring, detecting the thermostat deadband maximum as the water temperature at which the thermostat turns the heating element off and detecting the thermostat deadband minimum as the water temperature at which the thermostat turns the heating element on; storing the detected thermostat deadband maximum as a load controller deadband maximum and storing the detected thermostat deadband minimum as a load controller deadband minimum; raising the thermostat set point; and controlling the electric water heater using the load controller by operations including closing the relay when the water temperature falls below the load controller deadband minimum and opening the relay when the water temperature rises above the load controller deadband maximum.

DETAILED DESCRIPTION

Disclosed herein are improved approaches for retrofitting a water heater with a load controller providing remote control of the heater elements. These approaches advantageously enable continued use of the existing water heater set point adjustment control to adjust the hot water temperature, and also retain the existing thermostat as a safety component to ensure that a failure of the remote control cannot raise the hot water to an unsafe temperature.

Figure 1:
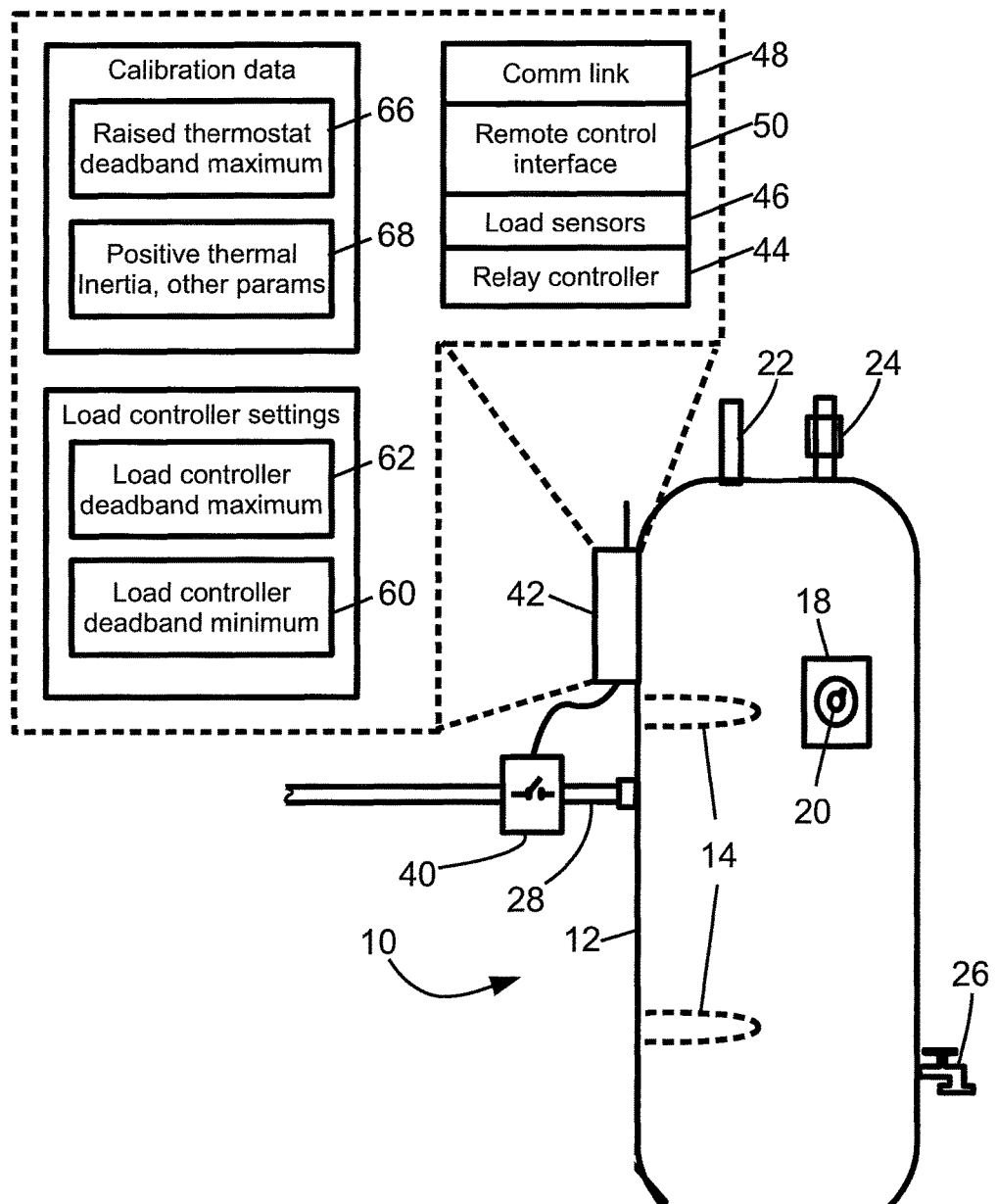
FIG. 1 diagrammatically shows a water heater including a thermostat that has been retrofit with a load controller and relay to provide remote control capable of turning the water heater both on and off.

With reference to FIG. 1, a water heater 10 of a design typical for residential or commercial use is described. The water heater includes a water holding (or storage) tank 12, one or more heating elements 14, namely in the illustrative water heater 10 an upper resistive heating element and a lower resistive heating element (the heating elements 14 are shown in phantom in FIG. 1, as they are actually located inside the water holding tank 12 and hence are not externally visible), and a thermostat 18 typically mounted externally on the skin of the tank 12 and including a temperature set point adjustment control 20 via which a user can adjust the temperature set point for hot water delivered by the water heater 10. Additionally, suitable plumbing is provided, such as a cold water inlet pipe 22, a hot water outlet pipe 24, and a tank relief valve and/or drain 26. Electrical power to operate the heating elements 14 is delivered via an electrical feed 28 to the water heater 10. Depending upon the design of the water heater 10, the electrical feed 28 may deliver single-phase power (typically 110 volts or 220 volts) or three-phase power.

The illustrative water heater 10 is suitably operates as follows The upper heating element is located towards the top of the holding tank 12, and the lower heating element is located towards the bottom of the tank 12. These heating elements 14 are typically controlled by respective thermostats installed on the skin of the storage tank—however, the two thermostats are operatively coupled together (typically in a primary-secondary thermostat relationship) and from a system-level operational standpoint can be treated as a single thermostat, illustrated as thermostat 18. A temperature sensor (not shown) measures water temperature in the tank 12 and the measured temperature is monitored by the thermostat 18 and used as a control input. The setting of the thermostat 18 is controlled by the set point adjustment control 20, for example configured as a dial control, via which the user can change the temperature set point of the hot water delivered by the water heater 10 at the hot water outlet 24. A hysteresis range, more commonly referred to as a "deadband", is defined around the dial setting (set point). Typically, the set point is at the middle of the deadband, but in some designs the set point may be closer to the deadband maximum (or minimum) of the deadband.

Figure 2:
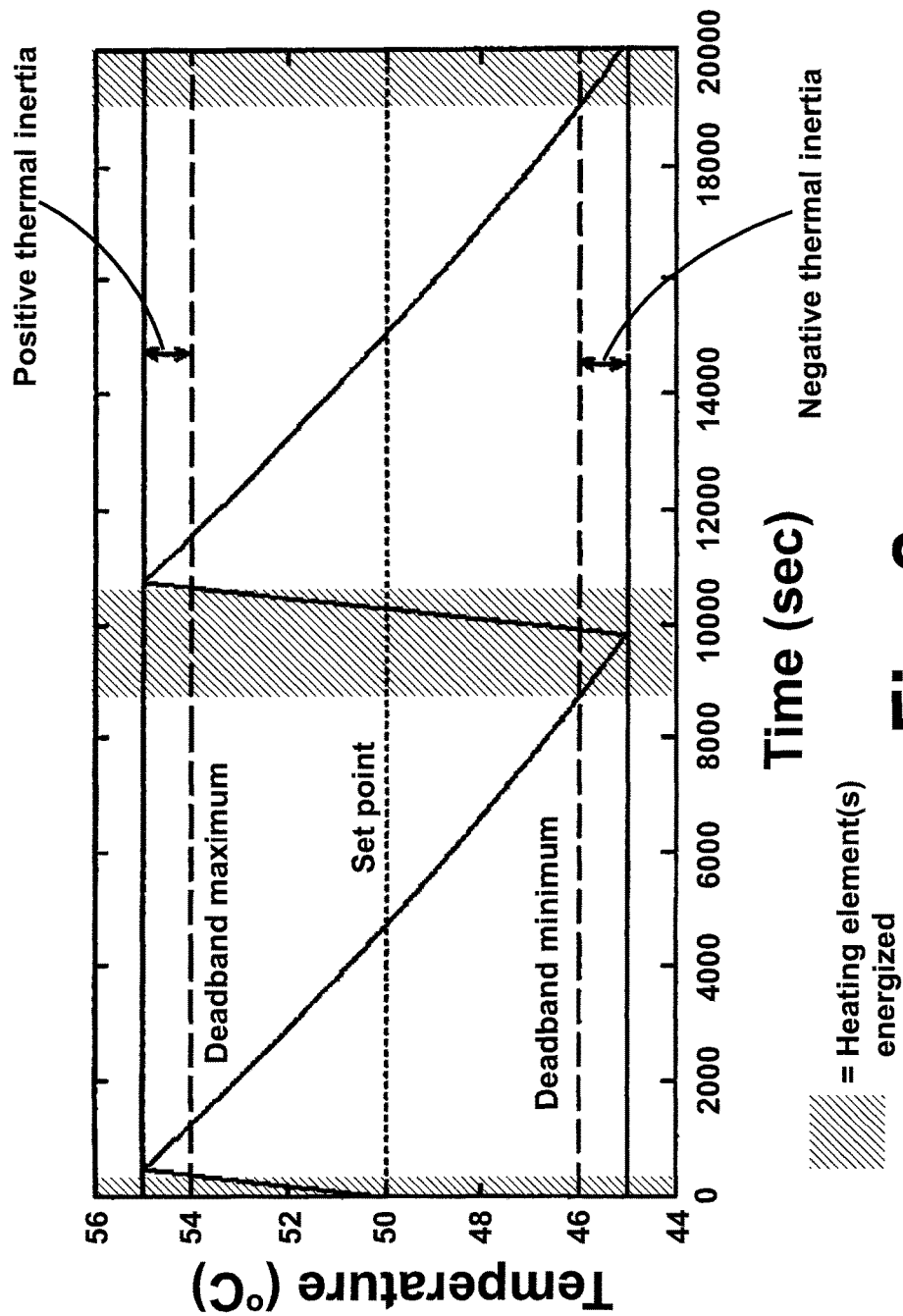
FIG. 2 diagrammatically shows a thermal cycle of the water heater of FIG. 1 under control of the thermostat.

With reference to FIG. 2, an illustrative temperature cycle pattern for the water heater 10 is plotted. The thermostat set point is the user's desired water temperature. The deadband maximum and minimum determine the limits at which the water heater changes its heating state (on/off). In FIG. 2, shading indicates those time intervals in which the heating elements 14 are energized. An indicated positive thermal inertia is the temperature overshoot above the deadband maximum that occurs when the heating elements 14 are switched off at the deadband maximum temperature. An indicated negative thermal inertia is the temperature undershoot below the deadband minimum that occurs when the heating elements 14 are switched on at the deadband minimum temperature. These inertias are the result of factors such as time delays between the temporal properties of the heat gradient between the heating elements 14 and the thermostat 18. Due to hysteresis, a heating element that is does not turn off until the deadband maximum is reached. Likewise, a heating element that is off does not turn on again until the deadband minimum is reached. No heater state change occurs in the region between these limits.

The illustrative water heater 10 is merely an example, and numerous modifications are contemplated, such employing a different number of heating elements, different types of heating elements, and so forth. The temperature cycling shown in FIG. 2 is also an illustrative example, but a water heater typically employs a hysteretic cycle with a deadband defined around the set point as such an approach reduces the frequency of on/off switching events.

With reference back to FIG. 1, the water heater 10 is retrofitted for remote control by adding a power relay 40 to control whether electrical power is delivered to the heating elements 14, and a load controller 42 comprising an electronic data processing device, for example a microcontroller or microprocessor and operatively connected non-transitory storage such as flash memory, read-only-memory (ROM), or so forth that stores firmware or software and data. As diagrammatically depicted in the upper-left inset of FIG. 1, the load controller 42 includes a relay controller 44 for opening or closing the power relay 40. The load controller 42 further includes (or has operative access to) load sensors 46 configured to sense at least the water temperature in the holding tank 12 and the operational state of the heating elements 14 (for example, by measuring the power flowing through the feed 28, and/or measuring heating element current and/or voltage, or reading equivalent quantities from the thermostat 18). The load controller 42 provides for remote control of the water heater 10 via actuating the relay 40—to this end, the load controller further includes a communication link 48, which may for example comprise a wireless (WiFi, Bluetooth, et cetera) communication link, a wired (e.g. wired Ethernet or power line communication, PLC) communication link, or so forth, and a remote control interface 50. The components 48, 50 operatively connect the load controller 42 with a demand response system, which may for example be a loads aggregator entity, a regional transmission organization (RTO), an independent system operator (ISO), or so forth, in order to receive commands to draw power, or cease drawing power, in support of demand-side load management.

In order for the retrofitted load controller 42 to be able to control both the on and off state of a water heater using the power relay 40, the thermostat 18 of the water heater 10 must be in the on position. In this way, any time the relay 40 is closed power flows to the heating elements 14, since the thermostat 18 is also set to produce this flow; whereas, any time the relay is opened power is cut off from the heating elements 14 by the open relay 40. To ensure that the thermostat 18 is in the on position, the thermostat set point of the water heater is raised by a (preferably small) amount which is sufficient to ensure that the temperature under control of the load controller 42 (including the overshoot due to the positive thermal inertia of the water heater 10) never exceeds the raised deadband maximum. In this way, the thermostat 18 never turns off and control is provided by the load controller 42.

Figure 3:
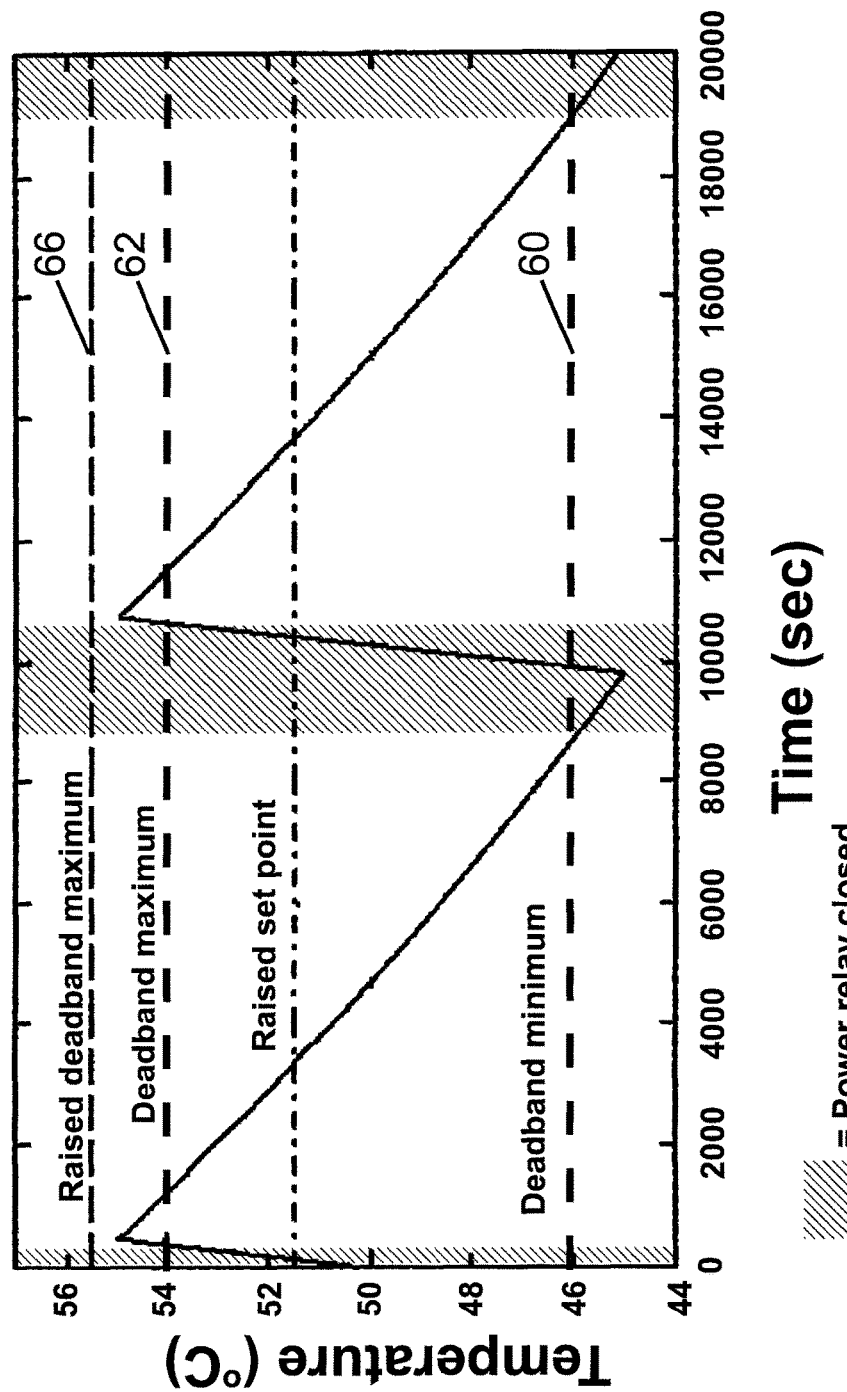
FIG. 3 diagrammatically shows a thermal cycle of the water heater of FIG. 1 under control of the retrofit load controller running a thermostat algorithm.

With continuing reference to FIGS. 1 and 2 and with further reference to FIG. 3, this retrofit control approach is illustrated. FIG. 3 is similar to FIG. 2, but illustrates operation of the water heater 10 using the load controller 42, in which the thermostat is set high enough to be always on, and turning on the heating elements 14 using the thermostat 18 is performed by closing the relay 40. To perform the retrofit control of FIG. 3, the load controller 42 stores certain information as indicated in the upper-left inset of FIG. 1. The stored information includes load controller settings: the deadband minimum 60 and the deadband maximum 62 (collectively referred to herein as deadband limits 60, 62). At least at the time of the retrofit installation, these parameters 60, 62 preferably have the same values as the deadband minimum and maximum, respectively, of the thermostat 18 before the retrofit installation of the load controller 42. Additional stored information includes the raised thermostat deadband maximum 66 (that is, the deadband maximum after being raised as part of the retrofit installation so that the thermostat 18 is always on), and optionally may include other calibration information 68 such as the positive thermal inertia. To perform the control shown in FIG. 3, the thermostat set point is raised by an amount sufficient to raise the deadband maximum of the thermostat 18 to the value of the raised thermostat deadband maximum 66. This is suitably done manually, by adjusting the set point dial 20 of the existing thermostat 18. For a typical water heater, the deadband maximum is a fixed number of degrees above the set point—as seen in FIG. 2 for the illustrative example the deadband maximum is 2° C. above the setpoint. Thus, to raise the thermostat deadband maximum from 54° C. (see FIG. 2) to obtain the raised deadband maximum of 55.5° C. shown in FIG. 3, the thermostat set point is adjusted upward from 50° C. shown in FIG. 2 to 51.5° C., that is, raised by 1.5° C. Then, the load controller 42 operates the relay 40 to mimic operation of the thermostat 18. The load controller 42 closes the relay 40 any time the water temperature falls below the deadband minimum 60, so as to energize (turn on) the heating elements 14. The load controller 42 opens the relay 40 any time the water temperature rises above the deadband maximum 6, so as to de-energize (turn off) the heating elements 14. When the temperature is in the deadband (that is, greater than the deadband minimum and less than the deadband maximum), the load controller 42 keeps the relay in its current state (either open or closed). In FIG. 3, shading indicates the time intervals during which the power relay 40 is closed, so as to energize the heating elements 14. As seen in FIG. 3, the raised thermostat deadband maximum 66 is sufficient to ensure that the maximum temperature reached during the cycle controlled by the load controller 42 (including the overshoot due to the positive thermal inertia) does not exceed the raised thermostat deadband maximum 66—this ensures that the thermostat 18 never turns off.

The thermostat 18 remains in operation during the retrofit control described with reference to FIG. 3. As a consequence, if the water temperature were to continue rising above the raised thermostat deadband maximum 66 without the load controller 42 opening the relay 40 (for example, due to a failure of the relay 40, or due to erroneous communication via the remote control 48, 50, or so forth), the resulting water temperature rise would be arrested when the temperature reached the raised thermostat deadband maximum 66, since at that point the thermostat 18 would act to turn off the heating elements 14. Thereafter (assuming the relay 40 continues to remain closed due to some error in the remote control system), the temperature would cycle under control of the thermostat 18. Thus, the thermostat 18 remains operative to ensure that a failure of the remote control 40, 42 cannot lead to the hot water being heated to an unsafe temperature.

In a typical water heater thermostat, the heating element on/off control of the thermostat 18, and hence the associated hysteresis, is typically controlled by a bimetallic strip that acts as a switch. How the hysteresis of this strip functions affects how much the set point of the thermostat 18 needs to be increased in order to satisfy the "always on" requirement for the retrofit control of FIG. 3. If the switch consistently stays in contact with the heating element until the deadband maximum is met, then the retrofit temperature control described with reference to FIG. 3 is applicable, and the thermostat set point advantageously is only raised slightly above the original thermostat deadband maximum plus the thermal inertia to ensure the "always on" condition. By raising the thermostat set point by only a small amount, the failsafe it provides against excessive water heating by a malfunctioning remote control is made more effective.

In some other thermostat designs, however, the switch operates without knowledge that it has yet to meet the deadband maximum may turn off. In this case, the set point of the thermostat 18 is suitably increased a sufficient amount to ensure that the deadband minimum is above the original deadband maximum. While this is a substantially larger temperature increase, it is still only about 10° C. for the example shown in FIG. 2, and so the failsafe provided by the thermostat remains at least partially effective.

More generally, the thermostat algorithm described with reference to FIG. 3 is merely an illustrative example, and other control algorithms can be employed to keep the temperature within the deadband (possibly with some overshoot and/or undershoot corresponding to the thermal inertias). While there is value in having the load controller 42 executing the thermostat algorithm to provide control behavior closely matching that originally provided by the thermostat 18, this is not necessary. In some embodiments it is contemplated for the thermostat algorithm executed by the retrofit load controller 42 to provide improved control as compared with the original thermostat 18, for example using proportional and/or integral and/or differential control to account for the thermal inertias and reduce the overshoot/undershoot.

In the illustrative example of FIGS. 1 and 3, the relay 40 provides on/off control, and may be embodied as a solenoid relay, a power semiconductor device, or so forth. Such an "on/off" device advantageously behaves similarly to a typical design of the thermostat 18 which also typically simply turns current on or off. However, it is contemplated to employ a more complex power regulation device in place of the relay 40, such as a power electronic circuit configured to enable variable current flow. Such a device operate in combination with a more complex thermostat algorithm executed by the load controller 42 to improve the control behavior as compared with the thermostat 18, for example by reducing the heater current as the temperature approaches the deadband maximum to reduce overshoot (positive thermal inertia) and slowly starting the current as the temperature approaches the deadband maximum to reduce undershoot (negative thermal inertia). Additionally, while it is advantageous to set the deadband limits 60, 62 to be the same as those of the original thermostat 18 before the retrofit installation so as to again closely model the behavior of the original thermostat 18, it is alternatively contemplated to change these limits, for example based on a request by the end-user to increase (or decrease) the hot water temperature. As another option, the deadband can be made larger (e.g. lowering the deadband minimum and/or raising the deadband maximum as compared with the settings of the thermostat 18) if such changes are acceptable to the end-users, since a wider deadband provides more dynamic range for energy storage/extraction in support of load response operations. While the illustrative load controller 42 is physically separate from the power relay 40 and mounted on the skin of the holding tank 12, it is alternatively contemplated to employ a unitary component that embodies both the power relay 40 and the load controller 42.

Figure 4:
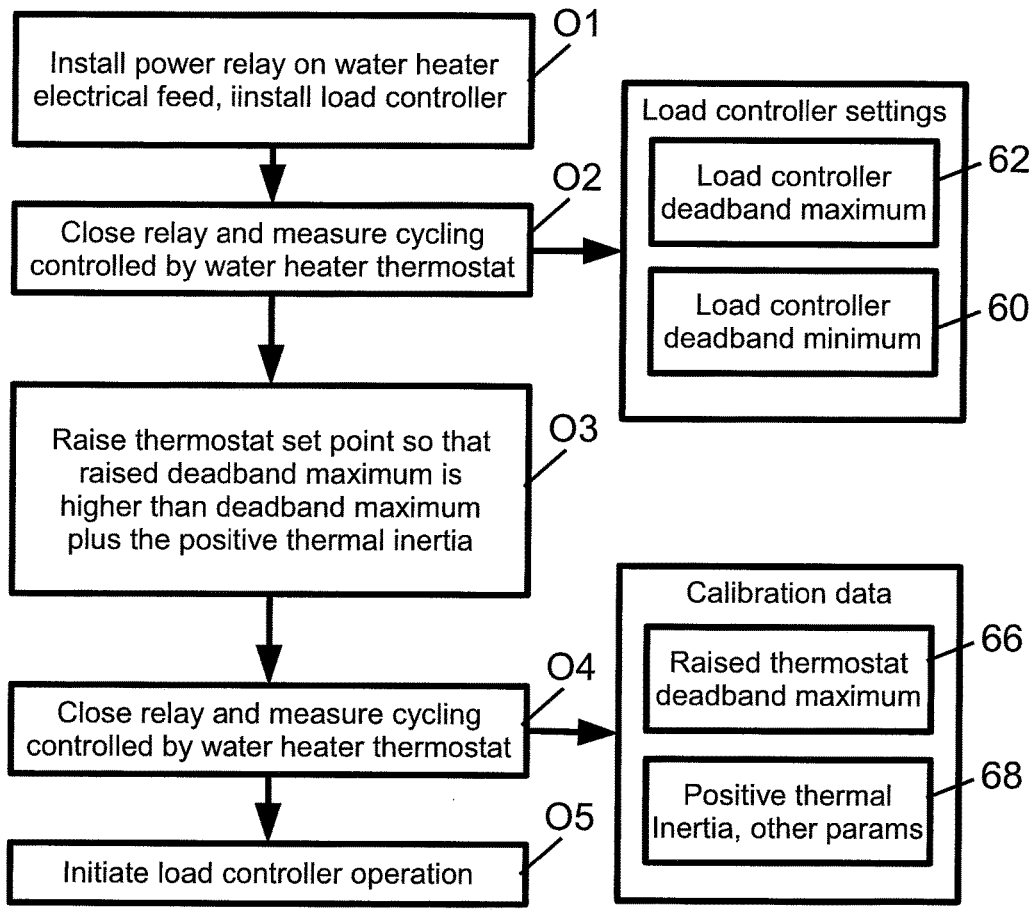
FIG. 4 diagrammatically shows a suitable process for installing the retrofit load controller and relay of FIG. 1.

With reference to FIG. 4, an approach for installing the retrofit remote control system is described. In an operation O1, the electrical feed 28 to the water heater 10 is disconnected, the power relay 40 is wired in line with the electrical feed 28, the electrical feed 28 is reconnected, and the load controller 42 is mounted and the control wires connected with the relay 40. This completes the hardware installation phase. Next, in an operation O2 the load controller 42 characterizes the settings of the thermostat 18 including the deadband limits and optionally other parameters such as the positive thermal inertia, and at least the deadband limits 60, 62 are stored as load controller settings. In a suitable approach for performing the operation O2, the load controller 42 closes the relay 40 and acquires water temperature readings and state data for the heating elements 14 (for example, acquiring electrical current and/or power readings) as a function of time over at least one cycle of control by the thermostat 18. In the operation O2, the load controller 42 is acquiring measurement data, and is not controlling the water temperature. The temperature readings are expected to exhibit the general cycle characteristic shown in FIG. 2. The deadband minimum 60 is identified as the temperature reading at the time the heating elements 14 are energized, as indicated by initiation of flow of electrical power (or current). Depending on the design of the water heater 10, the current may initially flow in only one of the heating elements 14. The negative thermal inertia is not necessarily characterized in operation O2, but if it is desired to do so this can be characterized by detecting the lowest water temperature reading. The process is analogous at the upper temperature end: the deadband maximum 62 is identified as the temperature reading at the time the heating elements 14 are de-energized, as indicated by shutoff of electrical power (or current), and the positive thermal inertia is suitably characterized by detecting the highest water temperature reading. The operation O2 may be performed under no load, that is, without drawing hot water from the tank 12 during the data acquisition operation O2, although it is also contemplated to draw hot water from the tank 12 during at least part of the cycle (for example, while the heating elements are off and the temperature is falling) in order to increase the speed of the thermal cycling. Drawing hot water during measurement of the positive thermal inertia could have the disadvantage of reducing the measured positive thermal inertia, producing an erroneously low value.

In an alternative embodiment, data acquisition of the operation O2 can be performed manually, for example by having a retrofit installer place a clamp-on ammeter on the feed 28 to monitor electrical current, and reading water temperature from a display of the thermostat 18. The installer suitably writes down the deadband minimum (the low temperature when the ammeter first shows a reading) and the deadband maximum (the high temperature when the ammeter shows the current is shut off), and reading the positive thermal inertia as the peak temperature reading observed.

In an operation O3, the thermostat set point is raised (which also raises the deadband maximum) so that the raised deadband maximum 66 is higher than the deadband maximum 62 measured in operation O2 plus the positive thermal inertia measured in operation O2. (In a variant embodiment, the positive thermal inertia may obtained from a product data sheet for the water heater 10). The set point adjustment is performed manually using the set point adjustment control 20. If the difference between the deadband maximum and the set point is a constant difference for the water heater 10 regardless of the absolute value of the set point (which is usually the case), then the set point is suitably raised by an amount slightly larger than the measured positive thermal inertia, which ensures that if the remote control opens the relay 40 when the temperature reaches the deadband maximum 62 then the positive thermal inertia will be insufficient to reach the raised deadband maximum 66, and thus the thermostat 18 never reaches the raised deadband maximum and turns off.

In a variant embodiment, the set point is not adjusted at all, and instead the stored deadband maximum 62 is set to a value that is less than the measured deadband maximum by an amount just larger than the positive thermal inertia. If the positive thermal inertia is small, e.g. less than 1-2° C., then this results in only a small loss in the energy storage capacity for demand response, and the end-user is unlikely to notice the small deadband maximum decrease.

After completion of operation O3, the retrofit remote controller 40, 42 is ready to operate, and could be initiated. However, the if the end-user were to later elect to change the set point of the thermostat 18 using the dial 20, such a change would not have any effect (unless it was downward of sufficiently large magnitude to cause the thermostat 18 to turn off before reaching the deadband maximum 62, in which case demand response performance would be compromised). To account for such a set point adjustment, it is further disclosed herein to monitor the position of the raised thermostat deadband maximum to detect any change in the thermostat set point.

To this end, in an operation O4, the load controller 42 closes the relay 40 and measures one or more thermal cycles controlled by the thermostat 18. As with the operation O2, the load controller is again operating in a data acquisition mode and is not controlling the water heater 10. The operation O4 measures the raised thermostat maximum deadband using the same process described for operation O2, and optionally measures other parameters such as the positive thermal inertia, and these values are stored in the calibration data as the raised thermostat deadband maximum 66 and optionally other parameters 68.

After this measurement, operation of the load controller 42 is initiated in an operation O4. The details of this operation depend on the control algorithms implemented in the firmware or software and on the commands received from the demand response system via the communication link 48. In a suitable embodiment, the load controller 42 ordinarily executes the thermostat algorithm described with reference to FIG. 3, in which it mimics the thermostat 18 turning on by closing the relay 40 when the water temperature falls to the deadband minimum 60 and mimics the thermostat 18 turning off by opening the relay 40 when the water temperature rises to the deadband maximum 62. However, if the load controller 42 receives a demand response command via the communication link 48 then it responds appropriately. For example, if the demand response command is a curtailment command then the relay 40 is kept open so that no power is consumed (optionally, this curtailment is programmed to cease by closing the relay if the water temperature falls below a specified minimum temperature). As another example, if the demand response command is a load shifting command, then curtailment is applied as just described during the time period from which the load is to be shifted, and during the time period to which load is to be shifted the relay 40 is closed to apply power. As yet another example, if frequency regulation is to be provided then the load controller 42 suitably monitors the automatic generation control (AGC) signal of the grid, or some parameter derived from the AGC, for example by a load aggregator, and opens or closes the relay 40 as appropriate to provide the desired load modulation for frequency regulation.

In the method of FIG. 4, only the positive thermal inertia is utilized. The negative thermal inertia is not used, and is optionally not measured. Alternatively, the negative thermal inertia may be measured and used to anticipate the latest point in time to turn heaters 14 on such that the temperature does not fall below the minimum desired temperature.

When the load controller 40, 42 is regulating the temperature as hot water is being drawn from the tank 12, the heating slope will be reduced or halted as cold water enters the tank via the cold water line 22 while the heating elements 14 are on. In this case, the load controller suitably operates as already described, by turning on when the deadband minimum 60 is crossed. To improve customer experience, the control algorithm executed by the load controller 42 could be modified to anticipate temperature crossings during periods of hot water draw, so as to mitigate the decrease in energy storage if the thermostat is not raised after installation. The presence of water demand will not affect the operation of the maximum deadband 62 because the demand will only lower the rate at which the deadband maximum 62 is approached, and therefore only reduce the thermal inertia, not increase it.

As a failsafe, the power control relay 40 is preferably a normally-closed relay. In the event of an issue with the load controller 42, it will release the relay so that it closes, thus allowing the thermostat 18 to regain control of the water heater 10. This approach is suitable if the positive thermal inertia is small, e.g. a few degrees Celsius or less, so that the raised thermostat deadband maximum 66 is not too high. If the positive thermal inertia is too large, then the raised thermostat deadband maximum 66 is correspondingly large and there may be potential for the water to reach an unsafe temperature.

Figure 5:
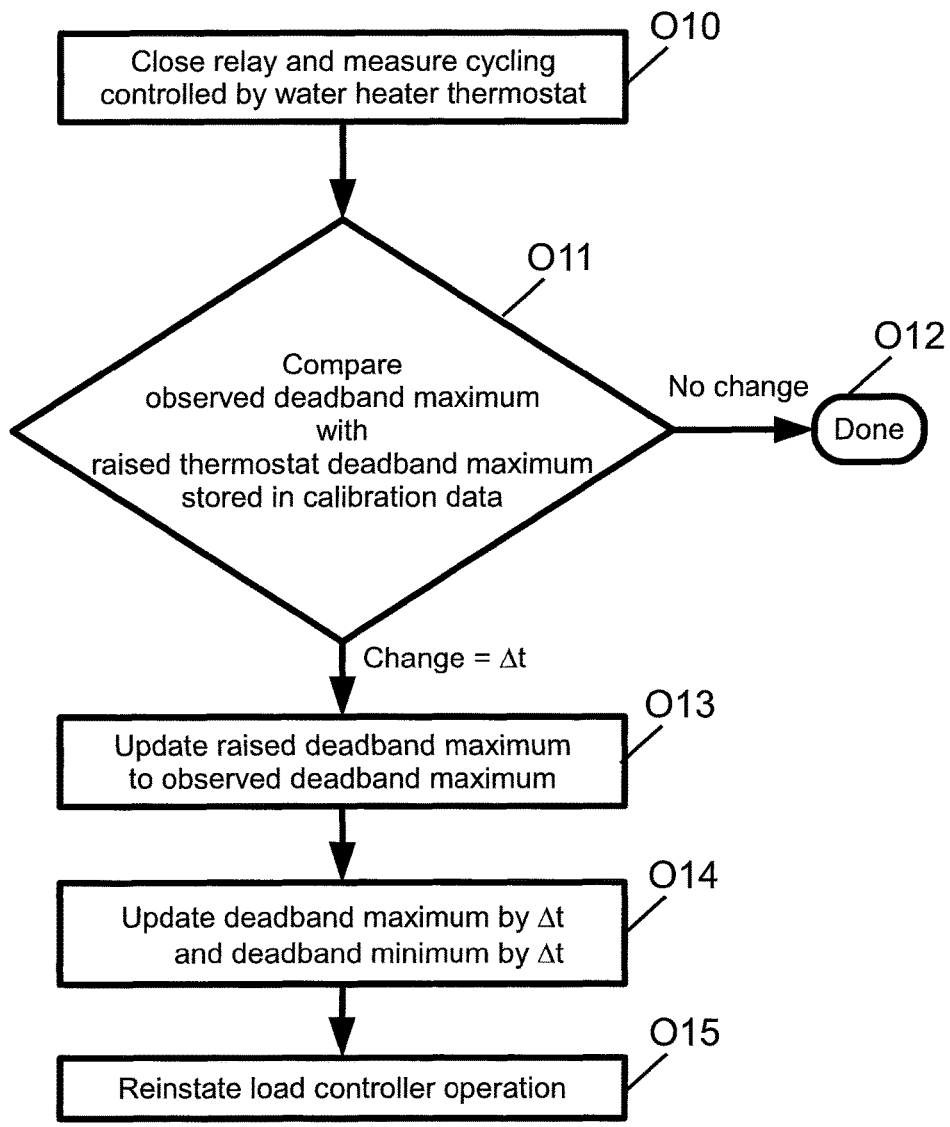
FIG. 5 diagrammatically shows a suitable process for updating the settings of the retrofit load controller to reflect an adjustment of the thermostat set point.

With reference to FIG. 5, an approach is described for using the stored raised thermostat deadband maximum 66 to detect a thermostat set point adjustment and update the settings of the retrofit load controller accordingly. The approach is based on the observation that the thermostat deadband follows the thermostat set point, so that for example a 2° C. increase in the thermostat set point results in (at least about) a 2° C. increase in the thermostat deadband maximum. In an operation O10, the relay 40 is closed by the load controller 42 and kept closed so that the thermostat 18 takes over control of the water heater 10, and cycling under thermostat control is measured as already described with reference to operation O2 (see FIG. 4) in order to measure the current thermostat deadband maximum. For best accuracy, this is preferably done at a time when no hot water is being drawn from the tank 12. If the load sensors 46 (see FIG. 1) include a water flow sensor, then this can be used to identify a period of time when water is not being drawn. If (as is the more usual case) no flow sensor is available, then the load controller 42 can use historical and day of the week data to anticipate periods of no demand, or can perform the process of FIG. 5 at a time when no water is likely to be drawn, for example at 3:00 am in the morning. In an operation O11, the current thermostat deadband maximum measured in operation O10 is compared to the stored thermostat deadband maximum 66. If the values are the same (within some allowed tolerance) then it is inferred that the thermostat set point has not been adjusted, and the process of FIG. 5 terminates in operation O12. O On the other hand, if in the operation O11 the current thermostat deadband maximum measured in operation O10 is found to be different from the stored thermostat deadband maximum 66 (by a difference denoted herein without loss of generality as Δt), then it is inferred that the end-user has adjusted the thermostat set point using the dial 20 by the same amount Δt equal to the difference between the measured current thermostat deadband maximum and the stored thermostat deadband maximum 66. Since both thermostat deadband limits track the thermostat set point, this also implies that the thermostat deadband minimum has been adjusted by this same amount Δt. Thus, in an operation O13 the raised deadband maximum 66 is updated by the amount Δt to equal the thermostat deadband maximum measured in the operation O10, and similarly in an operation O14 the load controller deadband maximum 62 is adjusted by Δt and the load controller deadband minimum 60 is adjusted by Δt.

In an operation O5, the load controller 42 reassumes control of the water heater 10, for example by closing the relay 40 until the thermostat turns on (unless the thermostat is already on when operation O4 is terminated) and thereafter opening and closing the relay 40 in accord with the program described with reference to FIG. 3, and/or taking other actions in compliance with received demand response instructions. If the process of FIG. 5 is performed on a daily basis, then if the end-user changes the setting on the thermostat 18 using the dial 20, the change propagates to the load controller 42 in one day or less. Of course, the process of FIG. 5 can be repeated more or less frequently than one day to provide more or less rapid propagation.

If the thermostat set point is raised by user operation of the dial 20, then this has no impact on operation of the load controller 42, since the stored raised thermostat set point 66 is already high enough to keep the thermostat in the "always on" condition, and (further) raising the thermostat set point does not alter this.

On the other hand, if the user operates the thermostat set point control 20 to lower the thermostat set point (i.e., lowers the dial 20), then the newly adjusted thermostat deadband maximum is lower than the stored raised thermostat set point 66. If the newly adjusted thermostat deadband maximum is lower than the load controller deadband maximum 62 plus the positive thermal inertia, then it becomes likely that the newly adjusted thermostat deadband maximum may be reached during operation of the water heater 10 under control of the load controller 42 running the thermostat algorithm described with reference to FIG. 3. In this case, the thermostat will turn the heaters off (even if the relay 40 is closed), and the load controller 42 loses control of the water heater 10 until the (also newly lowered) thermostat deadband minimum is reached so that the thermostat turns back on. This situation can be addressed in various ways. In one approach, no extra action is taken, and the water heater operates under this "mixed control" mode until the process of FIG. 5 runs to detect the thermostat set point change. The impact is relatively minor since the mixed control is still constrained by the thermostat so that the water temperature will satisfy the end-user—the main impact is compromised demand response by the water heater 10, and this may be acceptable for the short duration until the process of FIG. 5 next run, especially if end-user set point adjustments are rare and the water heater 10 is part of a relatively large load aggregation providing the demand response.

In another approach, the load controller 42 is programmed to monitor compliance of the heating elements 14 with the setting of the relay 40, and will thus detect the situation when the relay 40 is closed yet no current is flowing in (or power consumed by) the heating elements 14. From this, it may be inferred that the thermostat 18 has turned the heating elements off, suggesting that the thermostat set point has been lowered. Moreover, the load controller 42 can detect the temperature at which the current (or power) in the heating elements 14 was cut off, and assign this temperature as the new value for the raised thermostat deadband maximum 66. The thermostat set point change Δt is thus the difference between the temperature at which the current (or power) in the heating elements 14 was cut off and the stored raised thermostat deadband maximum 66. This process of detecting the turn-off of the heating elements 14 with the relay 40 closed and thereby determining Δt is thus equivalent to the operations O10, O11 of the process of FIG. 5. The update operations O13, O14 can then be performed as previously described using this determined Δt, and the load controller 42 resumes (or continues) operation as per operation O15 using the newly updated load controller deadband limits 60, 62. As this variant process operates in response to the first thermal cycle under the load controller 42 that is performed immediately after the user adjusts the dial 20 to lower the thermostat set point, the delay for the change to propagate to the load controller 42 is very fast, i.e. one thermal cycle.

The skilled artisan will readily recognize that the various stored quantities 60, 62, 66, 68 may be stored in various formats. For example, the load controller deadband limits 62, 64 may be stored as a value for the deadband minimum and a value for a deadband maximum. Alternatively, the load controller deadband limits 62, 64 may be stored as a single value, namely a load controller set point, with a deadband predefined respective to the load controller set point (e.g., the load controller deadband minimum being a predefined 2° C. below the load controller set point and the load controller deadband maximum being a predefined 2° C. above the load controller set point). In a similar variant approach, the load controller deadband limits 62, 64 may be stored as a single value, namely the load controller deadband maximum, with the deadband minimum predefined as a fixed temperature difference below the deadband maximum (e.g., the load controller deadband minimum being a predefined 4° C. below the load controller deadband maximum). It is also contemplated for the temperatures to be stored in various types of units, for example storing temperature values as thermocouple voltages rather than as degree Celsius (° C.) values, which may be convenient and computationally efficient if temperature is read using a thermocouple. Terminology used herein such as "storing deadband minimum and maximum temperatures" is intended to encompass all such storage format variants and the like. Similar construction applies to terms such as "positive thermal inertia", which may be variously quantified as (by way of illustrative example): (1) the highest water temperature measured after the thermostat turns the heating element off (together with knowledge of the thermostat deadband maximum), or (2) the difference between the highest water temperature measured after the thermostat turns the heating element off and the thermostat deadband maximum.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An electric water heater control system for controlling a water heater having a heating element and a thermostat, the electric water heater control system comprising:
a power regulation device configured to regulate electrical power to the heating element of the water heater; and
a load controller operatively coupled to operate the power regulation device, the load controller comprising an electronic data processing device, non-transitory storage storing at least load controller deadband limits, and a communication link, the load controller programmed to:
perform a thermostat algorithm to operate the power regulation device to regulate water temperature in the electric water heater respective to the stored load controller deadband limits,
perform a thermostat deadband measurement algorithm to detect the thermostat deadband limits,
set the stored load controller deadband limits based on the detected thermostat deadband limits,
perform a monitoring operation including measuring water temperature and monitoring electric current or power to the heating element over time with the power regulation device applying power to the heating element of the electric water heater,
during the monitoring operation, detect the thermostat deadband maximum as the water temperature at which the thermostat turns the heating element off,
during the monitoring operation, detect the thermostat deadband minimum as the water temperature at which the thermostat turns the heating element on,
during the monitoring operation, detect the highest water temperature measured after the thermostat turns the heating element off, and store a raised thermostat deadband maximum in the non-transitory storage of the load controller wherein the raised thermostat deadband maximum is greater than the highest water temperature measured after the thermostat turns the heating element off.

2. The electric water heater control system of claim 1 wherein the load controller is further programmed to perform a thermostat adjustment detection algorithm after performing the load controller setup algorithm, the thermostat adjustment detection algorithm including:
measuring water temperature and monitoring heating element current or power over time with the power regulation device applying power to the heating element of the electric water heater and detecting a current thermostat deadband maximum as the water temperature at which the thermostat turns the heating element off;
determining a thermostat set point change as equal to a difference between the current thermostat deadband maximum and the raised thermostat deadband maximum stored in the non-transitory storage of the load controller;
after the determining, updating the raised thermostat deadband maximum stored in the non-transitory storage of the load controller to equal the current thermostat deadband maximum; and
adjusting the stored load controller deadband limits based on the determined thermostat set point change.

3. The electric water heater control system of claim 1 wherein setting the stored load controller deadband limits based on the detected thermostat deadband limits includes:
setting the stored load controller deadband maximum equal to the detected thermostat deadband maximum; and
setting the stored load controller deadband minimum equal to the detected thermostat deadband minimum.

4. The electric water heater control system of claim 1 wherein the power regulation device comprises a power relay.

5. The electric water heater control system of claim 1 wherein the load controller is further programmed to perform a demand response algorithm in response to a demand response instruction received via the communication link of the load controller to increase or decrease energy consumption by the electric water heater.

6. The electric water heater control system of claim 5 wherein the demand response algorithm includes at least one of:
(1) operating the power regulation device to reduce or turn off power to the heating element of the electric water heater in response to a demand response instruction comprising a curtailment instruction, and
(2) operating the power regulation device to increase or decrease energy consumption by the electric water heater in response to a demand response instruction comprising an automatic generation control (AGC) signal.

7. An electric water heater control system for controlling a water heater having a heating element and a thermostat, the electric water heater control system comprising:
a power regulation device configured to regulate electrical power to the heating element of the water heater; and
a load controller operatively coupled to operate the power regulation device, the load controller comprising an electronic data processing device, non-transitory storage storing at least load controller deadband limits, and a communication link, the load controller programmed to:
perform a thermostat algorithm to operate the power regulation device to regulate water temperature in the electric water heater respective to the stored load controller deadband limits,
perform a thermostat deadband maximum detection algorithm including:
performing a monitoring operation including measuring water temperature and monitoring heating element current or power over time with the power regulation device applying power to the heating element of the electric water heater; and
during the monitoring operation, detecting the thermostat deadband maximum as the water temperature at which the thermostat turns the heating element off,
store the detected thermostat deadband maximum in the non-transitory storage of the load controller, and
perform a thermostat adjustment detection algorithm including:
repeating the thermostat deadband maximum detection algorithm to generate a current thermostat deadband maximum;
determining a thermostat set point change as equal to a difference between the current thermostat deadband maximum and the thermostat deadband maximum stored in the non-transitory storage of the load controller;
after the determining, updating the thermostat deadband maximum stored in the non-transitory storage of the load controller to equal the current thermostat deadband maximum; and
adjusting the stored load controller deadband limits based on the determined thermostat set point change.

8. An apparatus comprising:
an electric water heater including a heating element and a thermostat having a raised thermostat deadband maximum;
a power regulation device configured to regulate power to the heating element of the electric water heater; and
a load controller operatively coupled to operate the power regulation device, the load controller comprising an electronic data processing device and non-transitory storage storing at least load controller deadband limits and the raised thermostat deadband maximum which is raised as compared with the load controller deadband maximum;
wherein the load controller is configured to:
(i) perform a thermostat algorithm to operate the power regulation device to regulate water temperature in the electric water heater respective to the load controller deadband limits without the regulated water temperature reaching the raised thermostat deadband maximum,
(ii) detect an initial thermostat deadband maximum by measuring water temperature and electric power or current to the heating element over time with the power regulation device applying power to the heating element and detecting the initial thermostat deadband maximum as the water temperature at which the thermostat turns the heating element off,
(iii) set the raised thermostat deadband maximum in the non-volatile storage of the load controller to the initial thermostat deadband maximum,
(iv) after performing operation (iii), detect an adjusted thermostat deadband maximum by measuring water temperature and electric power or current to the heating element over time with the power regulation device applying power to the heating element and detecting the adjusted thermostat deadband maximum as the water temperature at which the thermostat turns the heating element off, (v) determine a thermostat set point change as equal to a difference between the adjusted thermostat deadband maximum and the initial thermostat deadband maximum, (vi) adjust the stored load controller deadband limits by an amount equal to the determined thermostat set point change, and (vii) set the raised thermostat deadband maximum in the non-volatile storage of the load controller to the adjusted thermostat deadband maximum.

9. The apparatus of claim 8 wherein the load controller is further configured to perform a load controller setup algorithm including:
performing a thermostat deadband measurement algorithm to detect the thermostat deadband limits of the thermostat of the electric water heater; and
setting the stored load controller deadband limits equal to the detected thermostat deadband limits.

10. The apparatus of claim 9 wherein the thermostat deadband measurement algorithm includes:
performing a monitoring operation including measuring water temperature and monitoring electric current or power to the heating element over time with the power regulation device applying power to the heating element of the electric water heater;
during the monitoring operation, detecting the thermostat deadband maximum as the water temperature at which the thermostat turns the heating element off; and
during the monitoring operation, detecting the thermostat deadband minimum as the water temperature at which the thermostat turns the heating element on.

11. The apparatus of claim 10 wherein:
the thermostat deadband measurement algorithm further includes, during the monitoring operation, detecting the highest water temperature measured after the thermostat turns the heating element off; and
the load controller setup algorithm further includes storing a raised thermostat deadband maximum in the non-transitory storage of the load controller wherein the raised thermostat deadband maximum is greater than the highest water temperature measured after the thermostat turns the heating element off.

12. The apparatus of claim 8 wherein the heating element of the electric water heater comprises upper and lower heating elements.

13. The apparatus of claim 8 wherein the power regulation device comprises a power relay.

14. The apparatus of claim 8 wherein the load controller further comprises:
a communication link, wherein the load controller is further programmed to perform a demand response algorithm in response to a demand response instruction received via the communication link of the load controller to increase or decrease energy consumption by the electric water heater.

15. A method of retrofitting an electric water heater that includes a thermostat for remote control of the electric water heater, the method comprising:
installing a relay on an electrical feed to the electric water heater;
measuring water temperature in the electric water heater and electric current or power through the electrical feed to the electrical water heater over time with the relay closed;
during the measuring, detecting the thermostat deadband maximum as the water temperature at which the thermostat turns the heating element off and detecting the thermostat deadband minimum as the water temperature at which the thermostat turns the heating element on;
during the measuring, detecting the highest water temperature measured after the thermostat turns the heating element off;
storing the detected thermostat deadband maximum as a load controller deadband maximum and storing the detected thermostat deadband minimum as a load controller deadband minimum;
raising the thermostat set point; and
controlling the electric water heater using the load controller by operations including closing the relay when the water temperature falls below the load controller deadband minimum and opening the relay when the water temperature rises above the load controller deadband maximum,
wherein the raising comprises raising the thermostat set point to a temperature higher than the highest water temperature measured after the thermostat turns the heating element off.

16. A method of retrofitting an electric water heater that includes a thermostat for remote control of the electric water heater, the method comprising:
installing a relay on an electrical feed to the electric water heater;
measuring water temperature in the electric water heater and electric current or power through the electrical feed to the electrical water heater over time with the relay closed;
during the measuring, detecting the thermostat deadband maximum as the water temperature at which the thermostat turns the heating element off and detecting the thermostat deadband minimum as the water temperature at which the thermostat turns the heating element on;
storing the detected thermostat deadband maximum as a load controller deadband maximum and storing the detected thermostat deadband minimum as a load controller deadband minimum;
raising the thermostat set point;
after raising the thermostat set point and before the controlling, measuring water temperature in the electric water heater and electric current or power through the electrical feed to the electrical water heater over time with the relay closed and detecting an initial thermostat deadband maximum as the water temperature at which the thermostat turns the heating element off;
controlling the electric water heater using the load controller by operations including closing the relay when the water temperature falls below the load controller deadband minimum and opening the relay when the water temperature rises above the load controller deadband maximum;
after the controlling, measuring water temperature in the electric water heater and electric current or power through the electrical feed to the electrical water heater over time with the relay closed and detecting an adjusted thermostat deadband maximum as the water temperature at which the thermostat turns the heating element off;

computing a thermostat set point change as the difference between the adjusted thermostat deadband maximum and the initial thermostat deadband maximum; and adjusting the load controller deadband maximum by the thermostat set point change and adjusting the load controller deadband minimum by the thermostat set point change.

* * * * *